United States Patent [19]

Michel

[11] 4,212,841
[45] Jul. 15, 1980

[54] MANUFACTURE OF HOLLOW THERMOPLASTIC ARTICLES

[75] Inventor: Edmond Michel, Brussels, Belgium

[73] Assignee: Solvay & Cie., Brussels, Belgium

[21] Appl. No.: 884,434

[22] Filed: Mar. 8, 1978

[30] Foreign Application Priority Data

Mar. 9, 1977 [FR] France .............................. 77 07443

[51] Int. Cl.² ............................................ B29C 17/07
[52] U.S. Cl. ....................................... 264/530; 65/79; 264/543; 425/534
[58] Field of Search ............................ 65/323, 79, 77; 264/538, 542, 543, 530; 425/534

[56] References Cited

U.S. PATENT DOCUMENTS

| | | | |
|---|---|---|---|
| 1,859,235 | 5/1932 | Chanfield | 65/323 X |
| 3,429,211 | 2/1969 | Pelot | 82/46 |
| 3,708,274 | 1/1973 | Fleck | 65/323 X |
| 3,740,868 | 6/1973 | Moore et al. | 34/105 |
| 3,770,098 | 11/1973 | Baugnies et al. | 198/377 |
| 3,894,835 | 7/1975 | Berggren et al. | 432/124 |
| 3,934,714 | 1/1976 | Matsumoto | 198/244 |
| 3,947,243 | 3/1976 | Sokolow | 432/124 |
| 3,973,941 | 8/1976 | Augeri | 65/79 |
| 4,004,906 | 1/1977 | Rowe | 65/79 X |
| 4,007,242 | 2/1977 | Lorgé et al. | 264/530 |
| 4,049,761 | 9/1977 | Lorgé et al. | 264/530 |
| 4,070,428 | 1/1978 | Krall et al. | 264/530 |
| 4,116,609 | 9/1978 | Obsomer et al. | 425/534 X |

FOREIGN PATENT DOCUMENTS

| | | |
|---|---|---|
| 827093 | 7/1975 | Belgium . |
| 626514 | 2/1936 | Fed. Rep. of Germany . |
| 1020269 | 9/1955 | Fed. Rep. of Germany . |
| 784361 | 1/1935 | France . |
| 1255859 | 1/1961 | France . |
| 1472387 | 1/1967 | France . |

*Primary Examiner*—Richard V. Fisher
*Attorney, Agent, or Firm*—Spencer & Kaye

[57] ABSTRACT

In the production of hollow bodies from a thermoplastic material, in which preforms are produced from thermoplastic material by molding, each resulting preform is transferred to a final blow-mold, and each preform is molded in a blow-mold to produce a desired final body, the production of each preform is carried out to provide the preform with a false neck having at least one positioning lug, and transfer of each preform to the blow-mold is carried out in such a manner as to cause the preform to have a predetermined angular position relative to the blow-mold by the action of its associated positioning lug.

11 Claims, 11 Drawing Figures

MANUFACTURE OF HOLLOW THERMOPLASTIC ARTICLES

BACKGROUND OF THE INVENTION

The present invention relates to the manufacture of hollow articles such as bottles, drums or barrels, from a thermoplastic by the technique of blow-molding of preforms.

Numerous techniques for manufacturing hollow bodies are already known, according to which preforms are produced, in a first stage, from a thermoplastic and these preforms are then transferred into final blow-molds in order to produce the desired hollow articles.

These techniques permit the production of hollow articles of a thermoplastic which is molecularly oriented. These hollow articles thus possess greatly improved mechanical properties. To manufacture these articles, an additional stage of heat conditioning of the preforms is generally provided before the preforms are introduced into the final blow-molds. In these techniques, preforms with a closed bottom are generally employed.

The processes and apparatuses currently known however suffer from certain important disadvantages which stem from the need to transfer the preforms.

Thus, if the preforms having a closed bottom are produced by blowing a tubular parison, they possess a weld line in the region of their bottom, which is caused by the flattening of the parison during closing of the molds used to produce them. The preforms then undergo a series of transfers before they are introduced into the final blow-molds. As a result, the weld line of the bottom of each preform can have any randomly occurring angular position at the instant when the preform is introduced into its associated final blow-mold. One consequence of this is that it is not possible to reliably utilize the final blowing operation in order to imprint relief inscriptions onto the bottom of the hollow bodies produced, because there is the danger that these inscriptions may be rendered illegible by the weld line of the bottom.

Furthermore, if it is desired to produce by this process hollow bodies having a highly elaborate neck, it is advantageous to mold this neck during the production of the preforms because the thermoplastic is then at a high temperature which renders molding easier and more precise. However, in practice this is difficult to do because there is a danger that the necks molded on the preforms will become damaged during the subsequent trapping of the preforms in the final blow-molds. The use of the technique is impossible if the necks are not axially symmetrical, such as necks provided with a thread.

SUMMARY OF THE INVENTION

It is an object of the present invention to provide an improved process and apparatus which make it possible to eliminate these disadvantages.

This and other objects are achieved according to the present invention, in a process for the production of hollow bodies from a thermoplastic which includes the production, by molding, of separate preforms from the thermoplastic, the transfer of the preforms produced into final blow-molds and the blow-molding of the preforms in these molds in order to produce the desired hollow bodies, by providing each preform, during its production, with a false neck which possesses at least one positioning lug, and then angularly positioning, or orienting, each preform about its longitudinal axis by means of the lug for the purpose of introducing it into the associated final blow-molds.

The term false neck is intended to denote any portion of the preform extending beyond the part of the preform which forms, or is intended to form, the neck of the final desired hollow body, or true neck, which remains in the hollow body finally obtained. The false neck is removed either before or after the final blowing and the plastic thereof is generally recycled after grinding. Hence, the preforms which can be used according to the invention possess a bottom part, a body part, a neck part and a false neck. The false neck may be closed or open depending on the molding technique employed for the production of the preforms.

The positioning lugs can be formed on the false neck of the preforms by using appropriate preform molds. Thus, it is possible to use preform molds whose molding surfaces include a cavity defining the false neck of the preforms, this cavity presenting, for example, localized hollows which correspond to the positioning lugs. These lugs may be hollow or solid dependent on the molding technique employed for the production of the preforms.

The number, shape and arrangement of the positioning lug or lugs formed on the false neck of the preforms during the production of the latter are not critical. However, it is preferred that all the preforms be provided with identical lugs.

Equally, the general shape of the preforms is immaterial as far as the process is concerned. Advantageously, preforms having a generally cylindrical shape and provided with a closed, preferably hemispherical bottom, are used. The preforms can be formed to have a neck molded to the final shape desired for the finished article. The process can also be employed to advantage for the production of hollow bodies of non-circular section, for the production of which it is desirable to employ preforms which are also of non-circular, for example elliptical, section, similar to, or preparatory for, that of the final desired hollow articles, or preforms, which have varying thicknesses around their circumference.

In the simplest embodiment of the process according to the invention, the preforms are equipped with a false neck having a single lug.

According to a preferred embodiment, the preforms are provided with a false neck having two lugs located in two parallel planes perpendicular to the axis of the preforms and preferably on two circular axially spaced ridges separated by a circular groove. These lugs can be located opposite one another or can be staggered angularly from one another relative to the preform axis. Preferably, preforms provided with two lugs angularly offset by 180° are employed.

According to the process of the invention, the lug or lugs provided on the false neck of the preforms are employed for angularly positioning, or orienting, the preforms successively introduced into the final blow-molds. Preferably, all the preforms are positioned in a uniform manner.

This positioning operation can advantageously be carried out by imposing on the preforms, by entrainment, a rotational movement about their longitudinal axis, and by interposing a stop or a similar device so as to block this rotational movement as a result of a positioning lug encountering a stop, so that the preforms are in a well-defined angular position. It is also possible to rotate the preforms, in a vertical position, in a ring which grips them loosely, until the lug or lugs engage in one or more slots formed in the ring.

If the process according to the invention is employed for the production of molecularly oriented hollow bodies and the preforms pass through a heat conditioning chamber where they are rotated about their longitudinal axis in order to permit uniform heating of their side wall, the device for rotating them can be employed to angularly position the preforms during, or preferably after, their passage through the conditioning chamber.

According to the process of the invention, the correct positioning of the preforms can be made still more efficient by employing certain positioning lugs to lock the positioning of the preforms, for example by gripping one of the lugs between locking stops.

According to the preferred embodiment of the process which is carried out with preforms having a false neck provided with two positioning lugs located in parallel planes, one of the positioning lugs is employed to block the rotation of the preform in the desired position, and the other is employed to lock the positioning of the preform.

The process according to the invention makes it possible to introduce the preforms into the final blow-molds while these occupy a well-defined angular position. Hence, this final molding can be utilized to imprint perfectly legible inscriptions onto the bottom of the resulting molecularly-oriented hollow bodies, in spite of the existence of a bottom weld line. It is also possible to employ preforms equipped with a neck which may have been molded to its final shape and provided with a thread, without the danger of spoiling this neck when closing the final blow-molds about the preforms. It is also possible to employ preforms whose body is not of perfectly circular cross section.

Furthermore, since the false neck of the preforms is removed after the final blowing, the lugs are removed and the final hollow bodies produced are free from any aesthetically unattractive mark or reference device.

According to a preferred embodiment, the preforms are produced by blow-molding but the process according to the invention is also applicable to preforms produced by other methods, such as injection-molded preforms or stamped preforms.

The present invention also provides novel apparatus which is particularly suitable for the application of the process described above.

This apparatus is composed of a device for the production of separate preforms from a thermoplastic, a device for blow-molding equipped with molds suitable for the production of hollow bodies from preforms, and a device for transferring the preforms in order to bring these to the blow-molding device. The molds with which the device for the production of the preforms is equipped present a cavity which is suitable for molding the preforms so as to give them a false neck provided with at least one positioning lug, and the device for the transfer of the preforms consists of movable fitments which transport the preforms, rotate them about their axis and block them in a defined angular position in cooperation with the positioning lugs.

The device for the production of the separate preforms can be any molding machine such as an injection molding machine, a blow-molding machine or a machine which uses the technique of stamping lengths of tubular parison.

However, for reasons of productivity it is preferred that this device should consist of a blow-molding machine, preferably of a rotary type, which is fed continuously with a hot and continuous tubular parison of the thermoplastic, delivered, for example, by an extruder.

The only component of this device which is essential for the process according to the invention consists of the molds with which the device is equipped. These molds must have molding surfaces that include a cavity which defines the shape of a false neck on the preforms produced. Furthermore, this cavity must have at least one hollow which causes the formation of at least one positioning lug on this false neck.

In order to keep the apparatus simple, it is preferable that all the molds with which this device is equipped should be perfectly identical, so that all the preforms produced have the same false neck carrying identical positioning lugs.

The movable fitments of the device for the transfer of the preforms are preferably mounted in a spaced-out manner on a device which drives these fitments. The preferably used components of this drive device are rotary supports equipped with radial arms which support the movable fitments and more particularly endless chains which are driven positively and on which the movable fitments are mounted.

The movable fitments preferably include supports suitable for seizing, at the level of their false neck, the preforms delivered by the device for the production of the preforms.

In a preferred embodiment, the movable fitments consist of supports equipped with grippers having movable jaws which are suitable for seizing the preforms at the level of their false neck.

The supports are furthermore provided with a mechanism which rotates them and hence rotates the preforms about their axis. For this purpose, the supports can be equipped, for example, with a toothed wheel so arranged as to engage in a rack which remains fixed during their movement. However, it is obvious that it is possible to use other mechanisms to cause the supports to rotate.

Furthermore, the movable fitments are equipped with means, such as stops, so arranged that during the rotation of the preforms these means come into contact with at least one lug provided on the false neck of the preforms, stop the rotational movement of the preforms and block the preforms in a defined angular position which is preferably identical for all successive preforms.

The movable fitments can furthermore be equipped with means which allow the positioning of the preforms to be locked in the blocked position. These means can for example consist of stops which bracket at least one positioning lug.

The path imposed on the movable fitments is such that the supports with which these fitments are equipped can seize the preforms coming directly or indirectly from the device for the production of the preforms and can present these positioned preforms to molds with which the device for blow-molding the hollow bodies is equipped. Preferably, the device for the transfer or the preforms is fed with preforms directly by means of the device for the production of the preforms. However, it can also be fed by a device for the storage of the preforms, a device for the heat conditioning of the preforms, a device for opening the false neck, or any other device intermediate between the device for molding the preforms and the device for blow-molding the desired hollow bodies.

According to a particularly advantageous embodiment of the apparatus according to the invention, the device for driving the movable fitments is composed of two successive endless chains which are driven positively and have a portion of their path in common. The firsr chain is equipped with spaced-out movable fitments including a support suitable for seizing the preforms at the level of their false neck and for causing them to rotate. The second chain is equipped with spaced-out movable fitments which includes a support suitable for seizing the preforms at the level of their false neck and for blocking the rotational movement of the preforms in an angular position defined by at least one positioning lug formed on the false neck of the preforms.

In this case, during travel over the portion of the path which the chains have in common, the preforms are held simultaneously by the movable fitments with which both the chains are equipped, one causing the preforms to rotate and the other blocking this rotation in a uniform angular position. At the end of the common path the supports of the movable fitments of the first chain release the preforms, which are thus transferred onto the second chain.

According to a variant which constitutes a further improvement, the device for driving the movable fitments is supplemented by a third endless chain which is positively driven and has a portion of its path in common with the path of the second chain. In this latter case, the third chain is equipped with spaced-out movable fitments which include a support suitable for seizing the preforms at the level of their false neck and for locking the positioning of these preforms.

The transfer of the preforms from the second to the third chain is effected similarly to the transfer between the first two chains.

The device for blow-molding the hollow bodies can be of any type. However, it preferably consists of a rotary support equipped with blow-molding units so arranged as to be capable of seizing the successive preforms presented by the movable fitments of the transfer device.

The apparatus according to the invention can easily be adapted to the production of molecularly oriented hollow bodies by passing the preforms through a heat conditioning device during their transfer between the device for the production of the preforms and the device for blow-molding the hollow bodies. In this latter case, it is preferred to use the device for the transfer of the preforms in order to pass the preforms through the heat conditioning device. It is then advantageous to subject the preforms to a rotational movement while they are passing through at least a part of the heat conditioning device.

The heat conditioning device generally consists of one or more chambers equipped with heating means suitable for gradually raising the preforms to their optimum temperature from the point of view of their subsequent orientation. The chamber is generally in the shape of a tunnel. The heating means with which this chamber is equipped may be of any type. Thus, the preforms can be conditioned by circulating a hot fluid such as air through the conditioning chamber. However, it is preferred to use heating elements of the infrared radiation type arranged lengthways against the internal wall of the heat conditioning chamber. The heat rays emitted by these elements can be focused onto the preforms which travel past the elements, by means of plane, parabolic or even elliptical reflectors which are fixed or are movable so that they accompany the preforms. The arrangement of the heating elements and their radiant power can be selected or controlled so as to produce a heat program along the preforms, in order to permit more efficient control of the wall thickness of the oriented hollow bodies subsequently produced from these preforms.

According to a particularly advantageous embodiment, it is possible to locate a series of pyrometers at the outlet of the heat conditioning device so as to measure the various programmed temperatures along the conditioned preforms and so as to be able, where appropriate, to utilize the information recorded in order to automatically control the power fed to the heating elements.

Finally, if desired, it is possible to provide a chamber for the heat stabilization of the preforms downstream or upstream of the heat conditioning device in order to achieve a uniform temperature of the preforms over their entire wall thickness.

The hollow bodies removed from the device for blow-molding these bodies can be freed from their false neck and this operation can be made automatic by using, for example, a deflashing device such as that described in Belgian Pat. No. 673,913 filed on Dec. 17th, 1965.

The apparatus according to the invention is furthermore explained in more detail in the description of a practical embodiment which now follows. However, this description is of course given purely by way of illustration and in no way limits the scope of the invention. Thus, the apparatus which will be described is designed for the production of oriented hollow bodies but obviously the invention can equally be exploited in connection with the production of non-oriented hollow bodies. Equally, the transfer device in the apparatus which will be described consists of endless chains but obviously other mechanisms can be envisaged. Thus, it is possible to envisage numerous embodiments of the apparatus suitable for carrying out the process of the invention.

DESCRIPTION OF THE PREFERRED EMBODIMENTS

Figure 1:
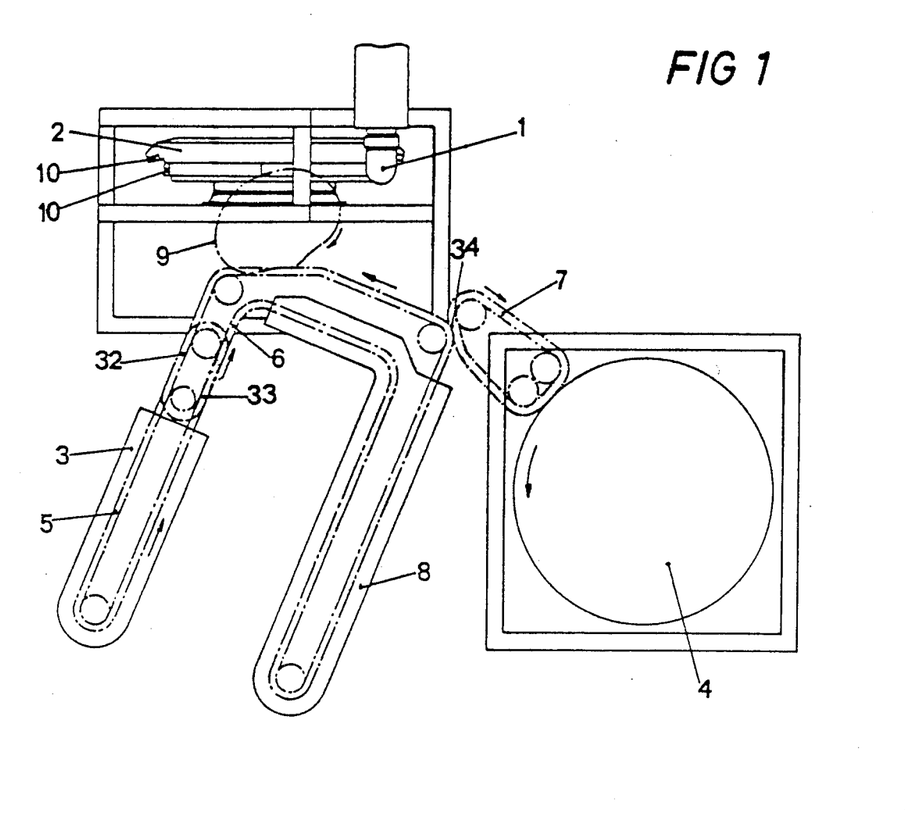
FIG. 1 is a schematic plan view of one preferred embodiment of apparatus according to the invention.

As can be seen in FIG. 1, the apparatus illustrated consists of a device for the production of a hot and continuous tubular parison from a thermoplastic, which device includes an extrusion head 1, a device 2 for the production of separate preforms from the delivered parison, a device 3 for thermally conditioning the preforms, a device 4 for blow-molding the preforms into finished hollow bodies, a first transfer chain 5 which transfers the preforms through the thermal conditioning device 3, a second transfer chain 6 of which the function will be described below, and a third transfer chain 7 which introduces the preforms into the device 4 for blow-molding the finished hollow bodies. The apparatus furthermore includes a heat stabilization chamber 8 and a mold release device 9, which is shown schematically and which ensures that the molded preforms are extracted from the device 2 for the production of the preforms.

Figure 2:
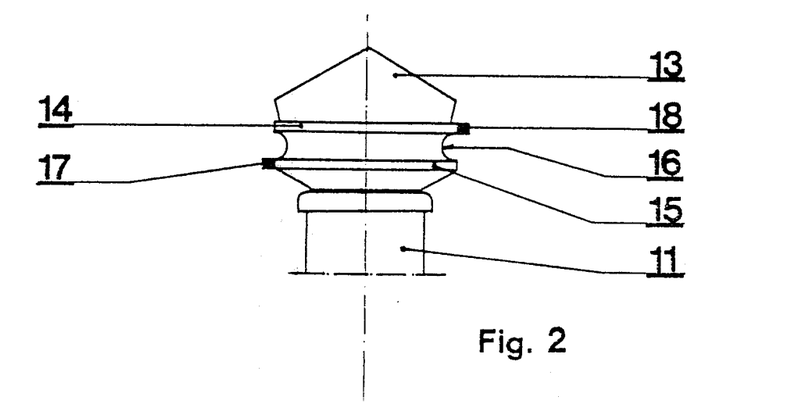
FIG. 2 is an elevational detail view of the neck and false neck portion of a preform produced on the machine for molding of the preforms according to the invention.
Figure 3:
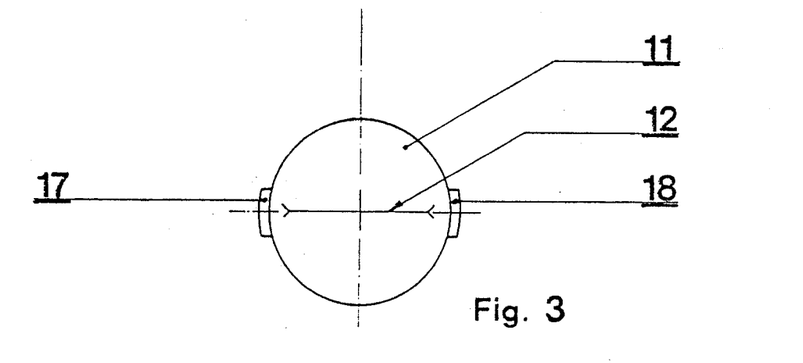
FIG. 3 is a plan view of the preform portion shown in FIG. 2.

The device 2 for the production of the preforms is a rotary blow-molding machine with a horizontal axis, equipped with contiguous molds 10. A machine of this type is described in Belgian Pat. No. 837,324, filed on Jan. 6th, 1976. The molds 10 with which this machine is equipped are provided with cavities which permit the production, by blow-molding, of cylindrical preforms 11, the neck region of which is shown in FIGS. 2 and 3, having a hemispherical bottom possessing a weld line 12 produced by the flattening of the parison in this zone, due to closing of the preform molds. Furthermore, each preform is provided with a false neck 13 possessing two axially spaced circular ridges 14 and 15 separated by an annular groove 16. Each circular ridge is provided with a respective positioning lug 17 or 18, and the two lugs are offset angularly by 180° from one another about the preform axis.

The path traversed by the second transfer chain 6 is such that the latter passes through the heat stabilization chamber 8 and furthermore acts as an auxiliary chain to bring the preforms produced by the device 2 to the first transfer chain 5.

Figure 6:
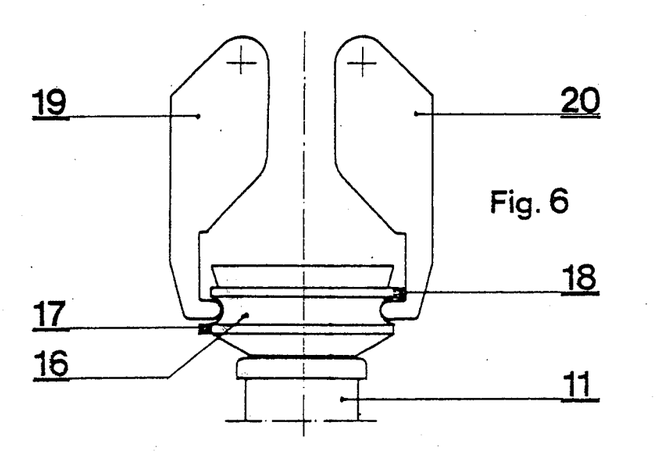
FIG. 6 is an elevational detail view of another gripper arrangement employed in the apparatus of FIG. 1.
Figure 7:
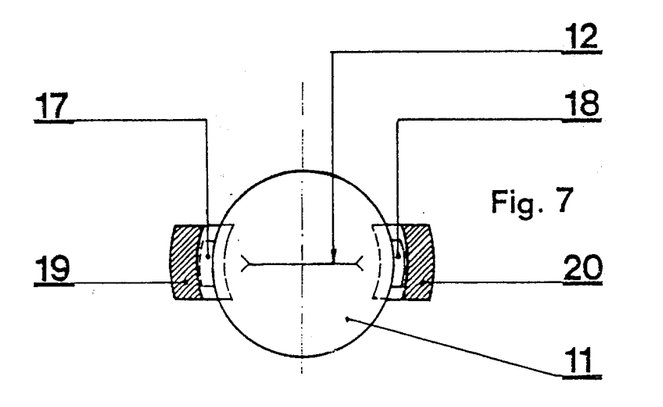
FIG. 7 is a cross-sectional plan view of the device of FIG. 6, taken through a plane above the preform false neck.

The first transfer chain 5 is an endless chain equipped with spaced-out movable fitments which are not shown. These fitments are provided with grippers having jaws 19 and 20, as shown in FIGS. 6 and 7, which are suitable for holding the preforms at the level of the circular groove 16 of their false neck. These grippers are designed so as to gently enclose the false neck of the preforms. They are furthermore equipped with means which are not shown and are suitable for causing them to rotate, and hence causing the preforms 11 to rotate about their longitudinal axes. These means in practice consist of toothed wheels firmly fixed to the grippers and of a fixed rack so arranged that the toothed wheels can engage in the rack.

Figure 4:
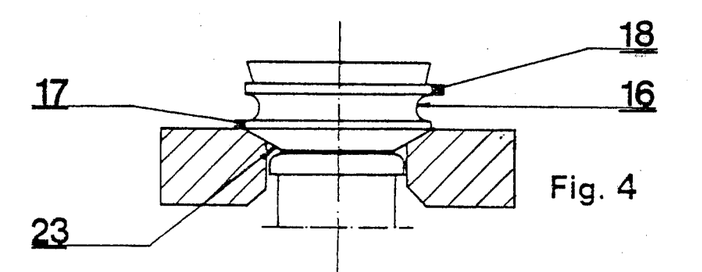
FIG. 4 is an elevational, detail view of one gripper arrangement for carrying a preform in the apparatus of FIG. 1, the gripper members being shown in cross section.
Figure 5:
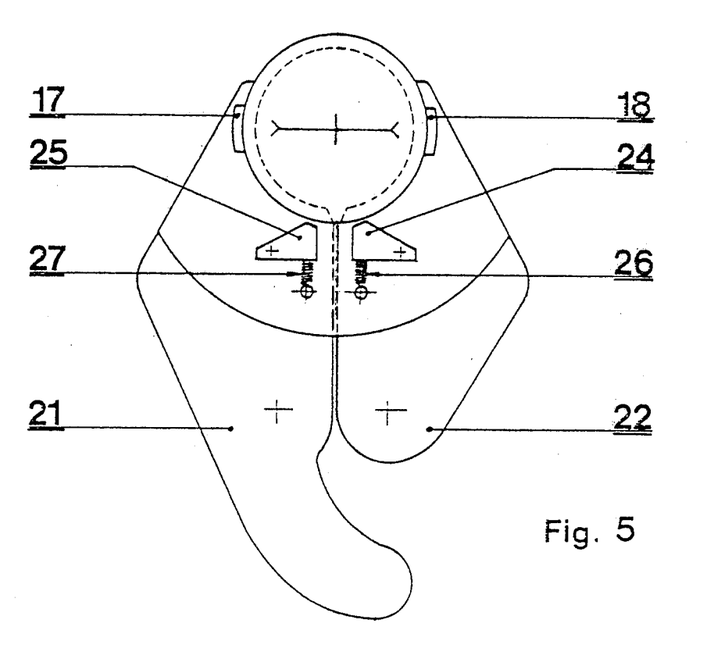
FIG. 5 is a plan view of the device shown in FIG. 4.

The second transfer chain 6 is also an endless chain equipped with spaced-apart movable fitments which are not shown. These fitments are provided with grippers having jaws 21 and 22, shown in FIGS. 4 and 5, which are suitable for seizing the successive preforms 11 by the lower part 23 of their false neck. The jaws 21 and 22 also include stops 24 and 25 which can be drawn back and are urged forward by compression springs 26 and 27.

The third transfer chain 7 is also an endless chain equipped with spaced-apart movable fitments which are not shown. These fitments are provided with grippers having jaws 28 and 29, shown in FIGS. 10 and 11, which are suitable for seizing the successive preforms 11 at the level of the circular groove 16 formed on their false neck. The jaws 28 and 29 are equipped with two fixed stops 30 and 31.

The spacing between the stops 24 and 25 and between the stops 30 and 31 is substantially equal to the thickness of the positioning lugs 17 and 18 formed on the false necks of the preforms 11.

The transfer chains 5, 6 and 7 have common path portions 32, 33 and 34.

The mold release device 9 can be identical to that described in Belgian Pat. No. 772,264, filed on Sept. 7th, 1971, apart from the fact that the hollow bodies withdrawn from the molds are preforms and that this device is designed to introduce the false necks of the preforms, which have been released from the mold, into the grippers provided on the second transfer chain 6, instead of depositing the preforms on a conventional conveyor.

The thermal conditioning device 3 is a conventional device of the tunnel type.

The heat stabilization device 8 consists of a chamber of the tunnel type equipped with means for causing a fluid, such as air, which may be heated, to pass through the chamber.

The device 4 for blow-molding the hollow bodies is in fact a rotary blow-molding machine with a vertical axis. The molding units with which this machine is equipped are preferably provided with means which permit lengthwise drawing of the preforms during blowing.

The basic mode of operation of the apparatus described can easily be deduced from the attached figures.

The preforms 11 molded successively in the molds 10 with which the machine 2 for blow-molding the preforms is equipped are removed from the molds by the mold release device 9 and transferred into the jaws 21 and 22 of the grippers provided on the transfer chain 6. The speed of travel of this transfer chain is obviously regulated so that each of its spaced-apart movable fitments can ensure that one preform is taken over. The mold release device 9 presents the successive preforms 11 to the jaws 21 and 22 of the grippers of the transfer chain 6, in such a position that the positioning lugs 17 and 18 are remote from the stops 24 and 25.

According to another embodiment, the false neck of the preforms can be chopped off directly in the molds 10 of the device for the production of the preforms, by equipping these molds with suitably arranged movable blades.

During the first part 32 of the path which is common to the transfer chains 5 and 6, the preforms are successively seized by the jaws 19 and 20 of the grippers provided on the transfer chain 5 and then released from the jaws 21 and 22 of the grippers provided on the transfer chain 6, and hence the preforms are transferred onto the transfer chain 5 which carries them through the thermal conditioning device 3. Obviously the spacing between successive movable fitments of the transfer chains 5 and 6, as well as the speed of travel of these chains, are so regulated as to allow reliable transfer of the preforms 11 from one chain to the other.

During their transfer through the thermal conditioning device 3, the preforms 11 are subjected to a rotational movement about their longitudinal axis, which movement is imparted to them by the grippers consisting of the jaws 19 and 20. This rotational movement can be achieved by means which are not shown, such as a fixed rack with which toothed wheels firmly fixed to the grippers engage.

Along the second part of the path 33 which is common to the transfer chains 5 and 6 and which is located at the outlet of the thermal conditioning chamber 3, the conditioned preforms are successively again seized by the jaws 21 and 22 of the grippers provided on the transfer chain 6 and then released from the jaws 19 and 20 of the grippers provided on the transfer chain 5, and hence the conditioned preforms are transferred onto the transfer chain 6.

Figure 8:
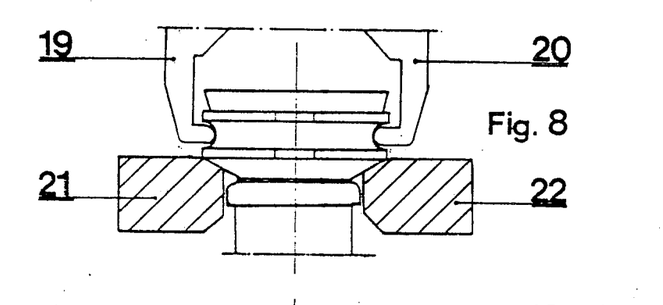
FIG. 8 is a view similar to that of FIG. 4 of another gripper arrangement employed in the apparatus of FIG. 1.
Figure 9:
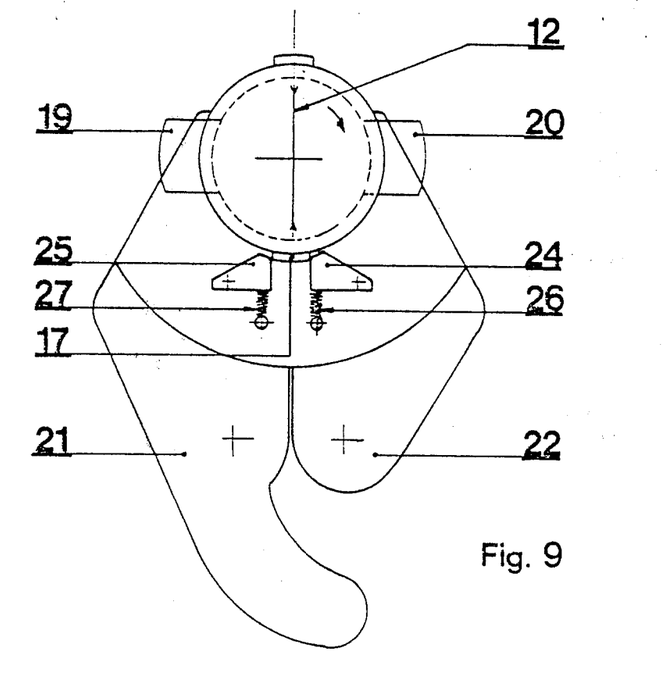
FIG. 9 is a plan view of the device of FIG. 8.

As is apparent more particularly in FIGS. 8 and 9, the conditioned preforms are held, during a part of the common path 33 of the transfer chains, both by the jaws 19 and 20 and by the jaws 21 and 22 of the grippers with which the two chains are equipped, and at that point the preforms are caused to rotate about their longitudinal axis by the jaws 19 and 20.

Consequently, the positioning lug 17 formed on the lower circular ridge 15 of the false neck 13 of the conditioned preform first comes into contact with the stop 24 and pushes the latter back against the action of the spring 26, and then comes into contact with the stop 25 which blocks this lug, thereby preventing any subsequent rotation of the preform. Furthermore, the spring 26 returns the stop 24 to its initial position and the lug 17 is hence blocked between the two stops 24 and 25.

Hence the result is that all the successive preforms seized by the jaws 21 and 22 of the grippers of the transfer chain 6 are automatically positioned as shown in FIGS. 8 and 9.

The conditioned preforms are then carried along by the transfer chain 6, after having been released from the grippers of the transfer chain 5, and pass through the chamber 8 for the heat stabilization of the conditioned preforms.

Along the part of the path 34 which is common to the transfer chains 6 and 7 at the outlet of the heat stabilization chamber 8, the preforms positioned on the chain 6 are transferred to the transfer chain 7.

Figures 10, 11:
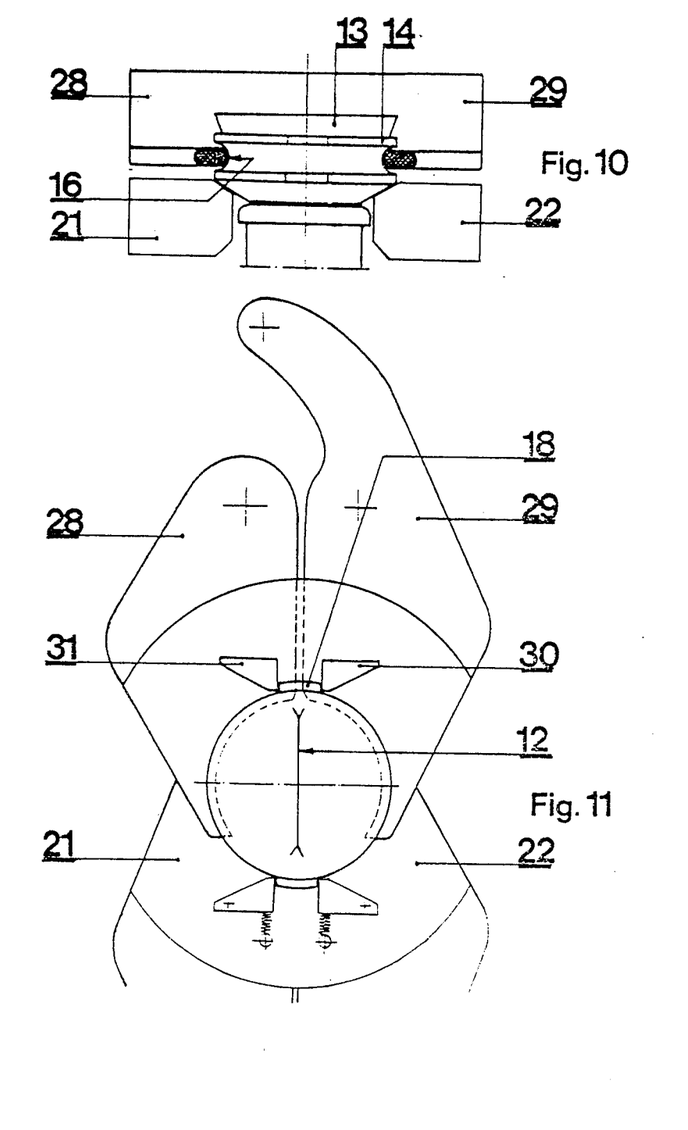
FIG. 10 is an elevational detail view of another gripper arrangement employed in the apparatus of FIG. 1.
FIG. 11 is a plan view of the arrangement of FIG. 10.

For this purpose, the preforms are successively seized at the level of their false neck 13 by the jaws 28 and 29, of the grippers, shown in FIGS. 10 and 11, with which the movable fitments of the transfer chain 7 are equipped and are then released by the jaws 21 and 22 of the grippers with which the movable fitments of the transfer chain 6 are equipped.

When they close onto the false neck 13 of the preforms and more particularly onto the circular groove 16 provided on this false neck, the jaws 28 and 29 trap, between the stops 30 and 31 with which they are provided, the positioning lug 18 formed on the upper circular ridge 14 of the false neck 13 of the preform 11.

In this way, the preform remains perfectly positioned on the transfer chain 7 and if it has a bottom weld line 12, this is always in a defined and known angular position at the instant at which these preforms are delivered by this chain into the molds with which the machine 4 for blow-molding the oriented hollow bodies is equipped.

After release from the mold the oriented hollow bodies produced on the molding machine 4 can have their false neck removed by cutting off the top by means of a conventional apparatus which is not shown.

Arrows in the figures indicate the direction of travel of the movable components of the apparatus and the direction of rotation of the preforms about their longitudinal axis.

It will be understood that the above description of the present invention is susceptible to various modifications, changes and adaptations, and the same are intended to be comprehended within the meaning and range of equivalents of the appended claims.

What is claimed is:

1. In a process for producing hollow bodies from a thermoplastic material, which includes producing preforms from thermoplastic material by molding, transferring each resulting preform to a final blow-mold, and blow-molding each preform in a blow-mold to produce a desired final body, the improvement wherein said step of producing comprises forming a false neck on each preform and forming at least one positioning lug on the false neck of each preform, and said step of transferring comprises: providing a stop adjacent the false neck of each preform at a defined location about the longitudinal axis of that preform; and causing each preform to undergo rotational movement about its longitudinal axis until its associated lug encounters, and thus comes into blocking engagement with, the stop associated with that preform, whereby each preform is brought into a predetermined angular orientation about its longitudinal axis relative to the blow-mold by the action of the positioning lug.

2. Process according to claim 1 wherein said step of forming a false neck is carried out to produce an open false neck.

3. Process according to claim 1 wherein each preform mold is provided with an appropriate cavity to form the positioning lug.

4. Process according to claim 1 wherein said step of producing is carried out to provide each preform with a molded neck.

5. Process according to claim 1 wherein each preform mold is provided with appropriate cavities to form two positioning lugs located in two mutually parallel planes perpendicular to the axis of the preform.

6. Process according to claim 5 wherein the two lugs are angularly offset from one another by 180°.

7. Process according to claim 5 wherein said step of forming a false neck on each preform includes forming two angular ridges on the false neck and locating each of the two lugs on a respective ridge.

8. Process according to claim 5 wherein said step of transferring is carried out by using one lug to position the preform and the other lug to lock the positioning of the preform.

9. Process according to claim 1 wherein said step of transferring comprises locking each preform in such predetermined position by enclosing the lug between two stops.

10. Process according to claim 1 wherein said step of producing preforms is carried out by blow-molding.

11. Process according to claim 1 further comprising heat conditioning the preforms during said step of transferring in order to produce oriented hollow bodies during said blow-molding step.

* * * * *